United States Patent [19]

Fritz et al.

[11] Patent Number: 5,350,202
[45] Date of Patent: Sep. 27, 1994

[54] METHOD AND APPARATUS FOR ATTACHING LENGTHS OF FIBERGLASS REINFORCED PLASTIC PIPE

[75] Inventors: Peter J. Fritz, Mequon; Timothy H. Houle, Wauwatosa, both of Wis.; Michael L. McCoy, Wichita, Kans.; Wayne A. Miller, Waukesha, Wis.; Paul M. Nyberg, Wichita, Kans.

[73] Assignee: Smith Fiberglass Products Inc., Little Rock, Ark.

[21] Appl. No.: 925,944

[22] Filed: Aug. 5, 1992

[51] Int. Cl.$^5$ .............................. F16L 55/00
[52] U.S. Cl. ................. 285/174; 285/392; 285/423; 264/271.1
[58] Field of Search ............... 285/174, 423, 390, 392, 285/333, 334, 355, 238, 239, 251; 264/271.1

[56] References Cited

U.S. PATENT DOCUMENTS

| | | | |
|---|---|---|---|
| 3,156,489 | 11/1964 | Deringer | 285/373 X |
| 3,784,239 | 1/1974 | Carter | 285/342 X |
| 3,838,873 | 10/1974 | Gilbert | 285/174 |
| 4,179,142 | 12/1979 | Schopp | 285/423 X |
| 4,428,602 | 1/1984 | Lambot et al. | 285/174 X |
| 4,711,474 | 12/1987 | Patrick | 285/355 X |
| 4,889,903 | 2/1991 | McAllister | 285/239 X |
| 5,109,929 | 5/1992 | Spears | 285/174 X |
| 5,143,409 | 9/1992 | Lalikos | 285/115 X |

FOREIGN PATENT DOCUMENTS

| | | | |
|---|---|---|---|
| 565191 | 7/1957 | Italy | 285/174 |
| 12018 | 6/1889 | United Kingdom | 285/392 |

Primary Examiner—Dave W. Arola
Attorney, Agent, or Firm—James Earl Lowe, Jr.; David R. Price

[57] ABSTRACT

A method of attaching first and second lengths of fiberglass reinforced plastic pipe, the method comprising the steps of winding the first length of pipe around a metal female member, threading a metal male member onto an end of the second length of pipe, and threading the male member into the female member.

15 Claims, 2 Drawing Sheets

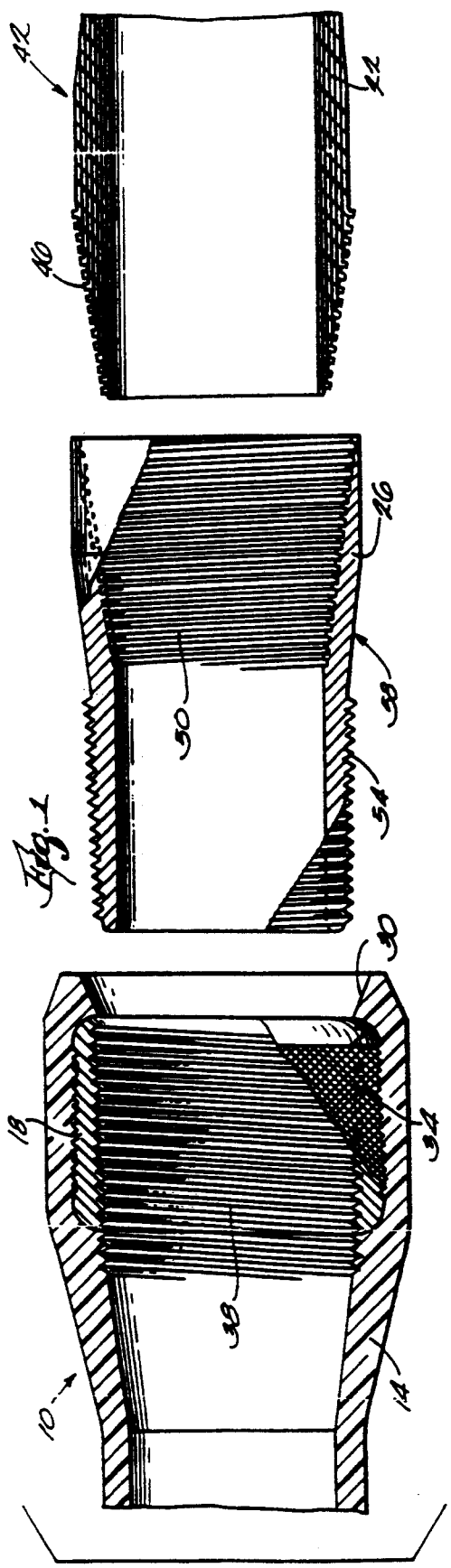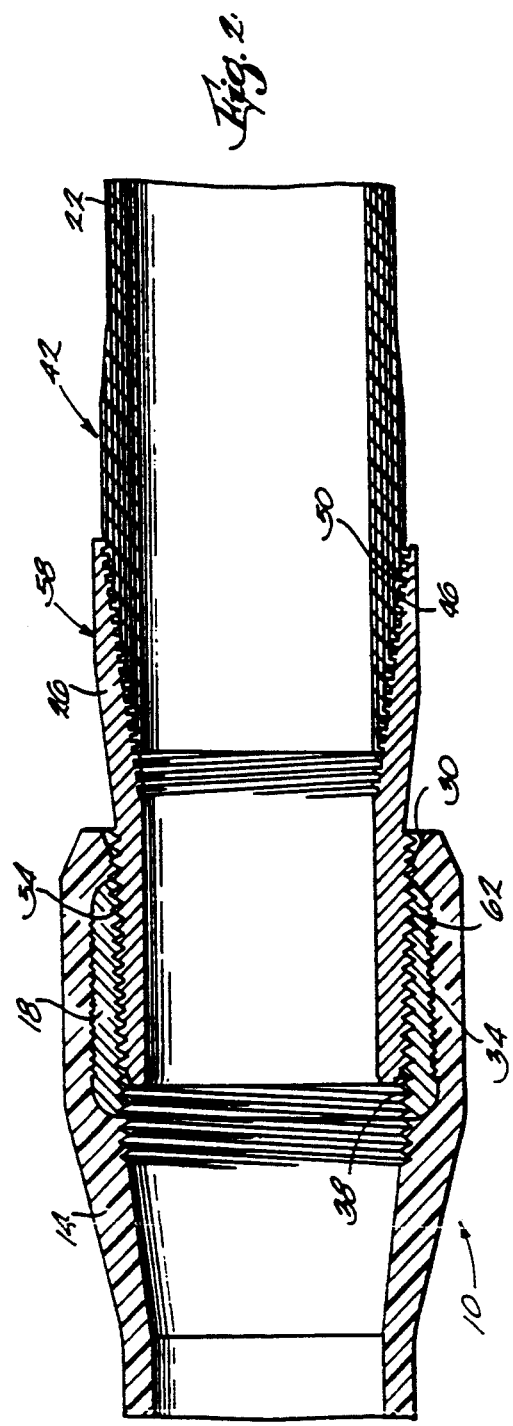

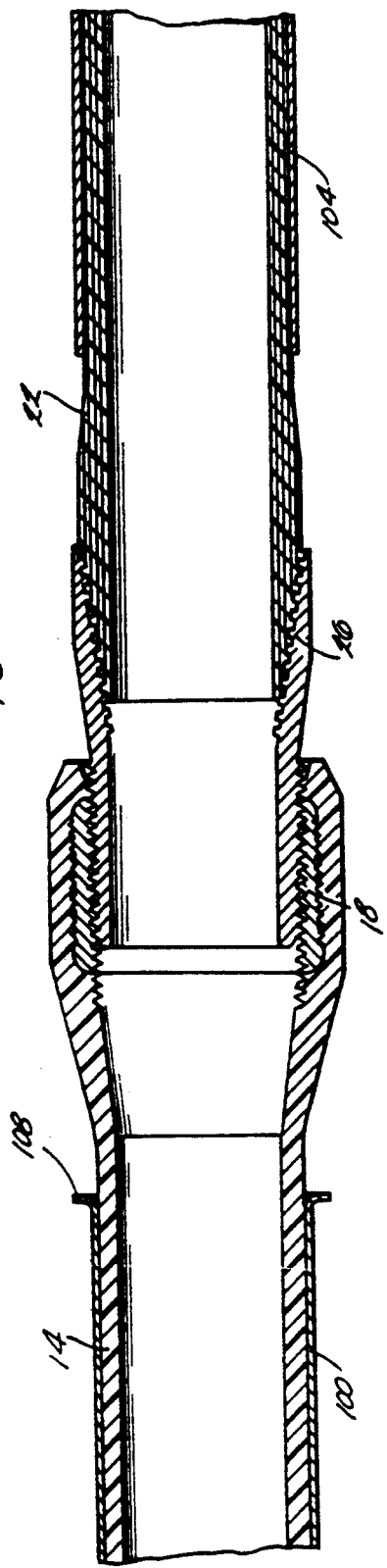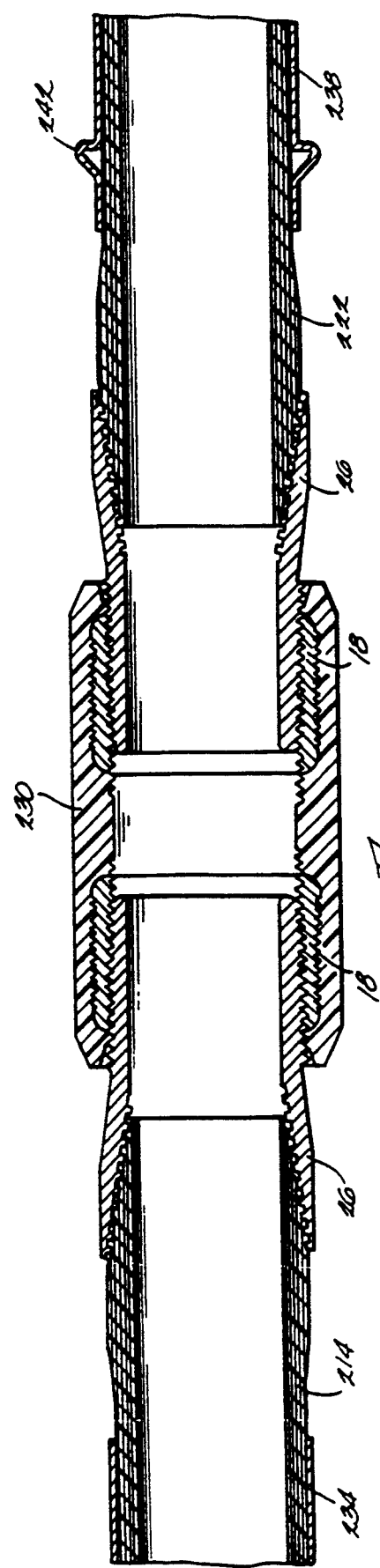

METHOD AND APPARATUS FOR ATTACHING LENGTHS OF FIBERGLASS REINFORCED PLASTIC PIPE

BACKGROUND OF THE INVENTION

The invention relates to methods and apparatus for joining composite or fiberglass reinforced plastic tubing or pipes.

It is known to connect lengths of fiberglass reinforced plastic pipe by providing one length of pipe with a male thread and the other length of pipe with a female thread. The lengths of pipe can be threaded directly to each other (this is known as an integral joint) or can be connected via a threaded fitting (this is known as being threaded and coupled).

SUMMARY OF THE INVENTION

The invention provides improved fiberglass reinforced plastic pipe assemblies, and method and apparatus for attaching lengths of fiberglass reinforced plastic pipe.

More particularly, the invention provides a fiberglass reinforced plastic pipe assembly comprising a length of fiberglass reinforced plastic pipe including an end, and an enlarged section which extends from the end of the length of pipe, and a metal male member secured to the enlarged section of the length of pipe. In one embodiment, the enlarged section includes a tapered, externally threaded portion onto which the male member is threaded, so that the male member engages several layers of the pipe. In addition to being threaded onto the pipe, the male member is preferably also bonded to the pipe.

The invention also provides a fiberglass reinforced plastic pipe assembly comprising a length of fiberglass reinforced plastic pipe having an end, and a metal female member secured to and received within the end of the length of pipe, the metal female member having an outer surface converging in the direction toward the end of the length of pipe.

The invention also provides a method of attaching first and second lengths of fiberglass reinforced plastic pipe, the method comprising the steps of winding the first length of pipe around a metal female member, threading a metal male member onto an end of the second length of pipe, and threading the male member into the female member.

The invention also provides a fiberglass reinforced plastic pipe assembly comprising a first length of fiberglass reinforced plastic pipe having an end, a metal female member secured to the end of the first length, a second length of fiberglass reinforced plastic pipe having an end, and a metal male member secured to the end of the second length, the male member being received in and removably fastened to the female member. In one embodiment, the female member has a knurled outer surface so as to "lock" the female member in position relative to the surrounding pipe. The end of the pipe surrounding the female member has therein a funnel-shaped opening facilitating insertion of the male member into the female member.

The metal threads of the male and female members have a high damage tolerance relative to that of fiberglass reinforced plastic pipe threads. The metal male and female members are also more durable and thus allow for repetitious make-and-breaks (field assembly and disassembly). The metal male and female members also offer high torque resistance relative to fiberglass reinforced plastic pipe and thus allows a higher torque to be applied during attachment in the field.

Other features and advantages of the invention will become apparent to those skilled in the art upon review of the following detailed description, claims and drawings.

DESCRIPTION OF THE DRAWINGS

FIG. 1 is an exploded, sectional view of a fiberglass reinforced plastic pipe assembly embodying the invention.

FIG. 2 is a sectional view of the assembly with its components threaded together.

FIG. 3 is a view similar to FIG. 2 showing an alternative embodiment of the invention.

FIG. 4 is a view similar to FIG. 2 showing a second alternative embodiment of the invention.

DESCRIPTION OF THE PREFERRED EMBODIMENT

A fiberglass reinforced plastic pipe assembly 10 embodying the invention is illustrated in FIGS. 1 and 2. The assembly 10 includes, generally, a first length of fiberglass reinforced plastic pipe 14, a tubular, metal female member 18, a second length of fiberglass reinforced plastic pipe 22, and a tubular, metal male member 26. The following is a detailed description of the components of the assembly 10 and the method of attaching the components.

The female member 18 is secured to the pipe 14 by winding the pipe 14 around the female member 18. The right end of the pipe 14 (as shown in the drawings) has therein a funnel-shaped opening 30 facilitating insertion of the male member 26 into the female member 18. The female member 18 has an outer surface 34 that is knurled or otherwise roughened so that the windings of the pipe 14 "lock" onto the female member 18. The outer surface 34 of the female member 18 has a reverse taper, or converges in the direction toward the end of the pipe 14, so that the pipe 14 is maintained under tensile loading. The female member 18 also has an internally threaded inner surface 38. The threads are tapered or converge away from the end of the pipe 14.

The second length of pipe 22 has an enlarged portion or section 42 extending from the end of the pipe 22. The enlarged portion 42 has an externally threaded wall 46 which is tapered or converges toward the end of the pipe 22.

The male member 26 is secured to second length of the pipe 22 by threading the male member 26 onto the wall 46 of the pipe 22 and by bonding the member to the pipe 22. For this purpose, the male member 26 has a tapered, internally threaded first wall portion 50 complementary and in contact with the pipe wall 46. Because the wall 50 is tapered, the male member 26 engages and is bonded to multiple layers of the pipe 22. The enlarged portion 42 of the pipe 22 provides reduced stress concentrations, a distributed bond load, and greater usable strength.

The threads of the male member 26 and of the pipe 22 are a modified buttress thread. As a result, axial loading of the pipe 22 results in a large shearing load on the pipe and male member teeth, while using as little of the wall thickness as is reasonable.

The male member 26 also has a tapered, externally threaded second wall 54 complementary with the inner surface 38 of the female member 18. The male member wall portion 54 threadedly engages the female member inner surface 38 when the male member 26 is screwed into the female member 18.

The female and male members 18 and 26 are preferably coated with a corrosion-resistant material 58. A protective coating can be applied by electrostatic powder coating, spraying, dipping, or the like. The female and male members 18 and 26 can be completely coated or partially coated. Only the portions of each member exposed to corrosive media need to be coated. Alternatively, the female and male members 18 and 26 can be made of a corrosion-resistant material. A lubricant 62 (FIG. 2) is applied to the threads of the members 18 and 26 before the members 18 and 26 are screwed together. A lubricant filler such as pipe dope can be used to dam up the root-crest variations in the mating threads.

The female and male members 18 and 26 should have sufficient thickness such that a high torque can be applied when the members 18 and 26 are screwed together in the field. The thickness of the female and male members 18 and 26 resists circumferential expansion in the female member 18 and resists circumferential compression in the male member 26. In the preferred embodiment, a wall thickness of about a quarter of an inch was found desirable in order to withstand a torque of about 1700 ft lbs.

An alternative embodiment of the invention is shown in FIG. 3. In the alternative embodiment, metal protective sleeves 100 and 104 are provided around the first and second lengths of pipe 14 and 22, so that tooling such as power tongs can be used to grip the pipe 14 and 22 without damage thereto. The sleeve 100 has rolled or otherwise formed thereon a bead 108 so that a concentric gripping device (not shown) has a stop for axial pulling. The bead 108 can be at the end of the sleeve 100, as shown, or can be spaced from the end.

A second alternative embodiment of the invention is shown in FIG. 4. In this embodiment, first and second lengths of pipe 214 and 222 each have thereon a respective male member 26. A fitting 230 is made of fiberglass reinforced plastic wound around two metal female members 18, with each female member 18 receiving a respective one of the male members 26. This is known as a threaded and coupled connection. The integral joint connection shown in FIGS. 1 and 2 is preferred because it requires fewer attachments, so it weighs less and typically costs less. The threaded and coupled connection requires more parts per joint. Sleeves 234 and 238 similar to the sleeves 100 and 104, respectively, shown in FIG. 3 are provided around the first and second lengths of pipe 214 and 222. The sleeve 238 has formed therein a bead 242. A sleeve (not shown) could also be provided around the fitting 230, if desired.

In another alternative embodiment (not shown), the fitting 230 can be a single piece of internally threaded metal rather than fiberglass reinforced plastic wound around metal female members.

Various features of the invention are set forth in the following claims.

We claim:

1. A method of attaching first and second lengths of fiberglass reinforced plastic pipe, the second length of pipe having an externally threaded end, said method comprising the steps of
    winding the first length of pipe around a metal female member having a threaded inner surface,
    threading a threaded inner surface of a metal male member onto the externally threaded end of the second length of pipe, and
    threading said male member into said female member.

2. A fiberglass reinforced plastic pipe assembly comprising
    a first length of fiberglass reinforced plastic pipe having an end,
    a metal female member secured to said end of said first length by said first length being wound around said female member and said female member having an outer surface converging in the direction toward said end of said first length,
    a second length of fiberglass reinforced plastic pipe having an end, said second length including an enlarged section which extends from said end of said second length, which has a plurality of layers of fiberglass, and which is tapered and externally threaded, and
    a male member received in and removably fastened to said female member, and said male member having a tapered, internally threaded wall threadedly connected to said enlarged section of said second length such that said male member wall engages a plurality of said layers of said second length.

3. An assembly as set forth in claim 2 wherein said female member has a knurled outer surface.

4. An assembly as set forth in claim 2 wherein said male and female members are coated with a corrosion-resistant material.

5. An assembly as set forth in claim 2 wherein said end of said first length has therein a funnel-shaped opening facilitating insertion of said male member into said female member.

6. An assembly as set forth in claim 2 and further including a second metal male member, a third length of pipe having an end, means for securing said second male member to said end of said third length of pipe, and means for releasably securing said metal female member to said second metal male member.

7. An assembly as set forth in claim 2 wherein said metal male member includes a first wall portion in contact with said second length of pipe, and a second wall portion which engages said metal female member.

8. An assembly as set forth in claim 2 and further including an outer protective sleeve on at least one of said first and second lengths of pipe.

9. A fiberglass reinforced plastic pipe assembly comprising a first length of fiberglass reinforced plastic pipe having an end,
    a metal female member, means for securing said female member to said end of said first length,
    a second length of fiberglass reinforced plastic pipe having an end, and
    a metal male member received in and removably fastened to said female member,
    wherein said male member has a tapered, internally threaded wall, and wherein said second length includes a plurality of layers of fiberglass and has a tapered, externally threaded wall threadedly connected to said male member wall such that said male member wall engages a plurality of said layers.

10. An assembly as set forth in claim 4 wherein said male member is threadedly connected to said female member.

11. An assembly as set forth in claim 6 wherein said first length is wound around said female member.

12. An assembly as set forth in claim 4 wherein said first length is wound around said female member.

13. An assembly as set forth in claim 2 wherein said male member is threadedly connected to said female member.

14. An assembly as set forth in claim 9 wherein said internally threaded wall of said male member is also bonded to a plurality of said layers of said second length.

15. A fiberglass reinforced plastic pipe assembly comprising a first length of fiberglass reinforced plastic pipe having an end, a metal female member, means for securing said female member to said end of said first length, a second length of fiberglass reinforced plastic pipe having an end, and a metal male member, means for securing said male member to said end of said second length, said male member being received in said female member, and means for removably fastening said male member to said female member, wherein said second length includes an enlarged section which extends from said end of said second length and which is threadedly connected to said male member.

* * * * *